United States Patent Office 2,946,773
Patented July 26, 1960

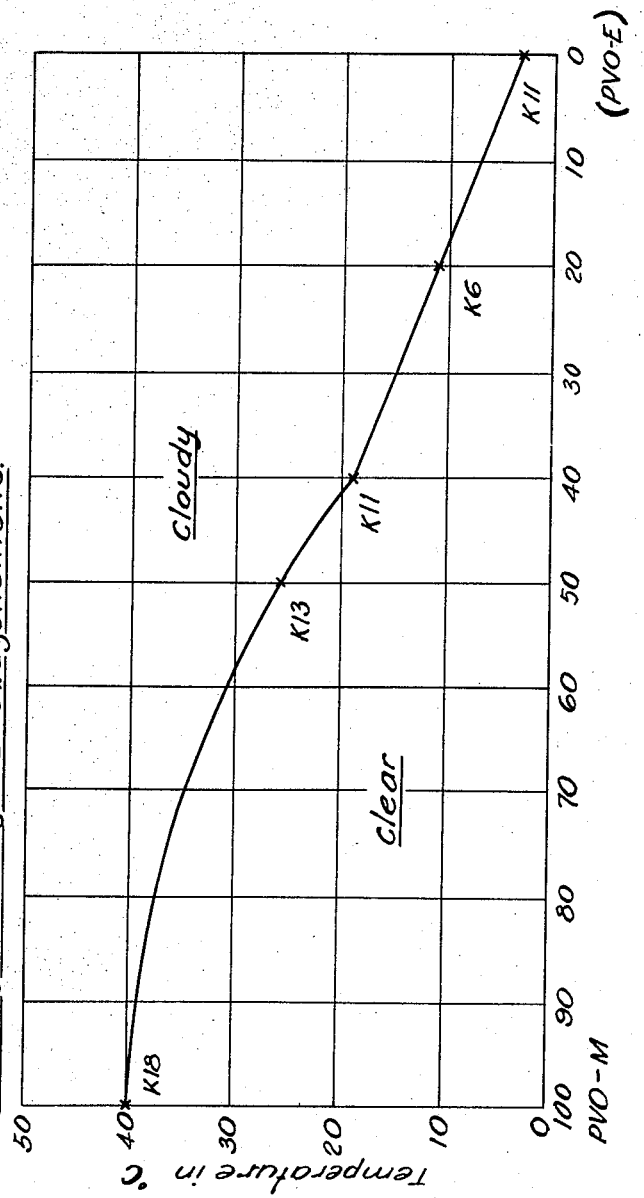

2,946,773

WATER-SOLUBLE COPOLYMERS OF RING-SUB-
STITUTED N-VINYL-2-OXAZOLIDINONE

Wilhelm E. Walles and William F. Tousignant, Midland, Mich., assignors to The Dow Chemical Company, Midland, Mich., a corporation of Delaware Filed May 7, 1958, Ser. No. 733,742

3 Claims. (Cl. 260—77.5)

The present invention resides in the general field of organic chemistry and is more particularly pertinent to the polymer art. It has specific reference to certain water-soluble copolymers of N-vinyl-5-ethyl-2-oxazolidinone (and its closely related isomers—all hereinafter generically referred to as VO—E) with N-vinyl-5-methyl-2-oxazolidinone (and its closely related isomer—both hereinafter generically referred to as VO—M), which copolymers may advantageously be provided with, and tailored so as to have, specific and readily controllable thermal coagulation (or "cloud") points in aqueous media.

Poly-N-vinyl-5-ethyl-2-oxazolidinone (PVO—E) and poly-N-vinyl-5-methyl-2-oxazolidinone (PO—M) are polymers of recent origin having many highly advantageous and remarkable properties. By way of illustration, both of the polymers have an unusual capacity for and the pronounced capability of attracting and accepting many of a wide variety of dyestuffs, including vat, acid, acetate, direct, naphthol and sulfur dyes. This property makes the polymers significantly attractive as dye-assisting adjuvants for many synthetic textile fibers that are normally difficult, if not impossible, to dye and in which the PVO—E or PVO—M may be incorporated. They may also be utilized with benefit as dye-stripping agents for various textile materials and, amongst other applications, may be employed with advantage in hair-setting compositions.

Still another highly beneficial use for either PVO—E or PVO—M is to employ them as coagulating or precipitating agents for removal of the haze-inducing ingredients from various vegetable beverages (including beer, etc.), which ingredients are believed to consists of pectins, tannins and/or protein complexes that occur in the beverage. In such application, the polymeric treating agents, when added to a beverage such as beer, wine and the like, cause coagulation and precipitation of the haze-inducing ingredients in the beverage to materially overcome its susceptibility to undergo chill-hazing phenomena. In such application, as is apparent, more desirable results are obtained if all or practically all of the treating agent is removed from the beverage after the treatment. In this way the clarified product is rendered practically, if not completely, free from residues thereof.

Although, within certain relatively severe limits, PVO—E will dissolve in water, its solubility in aqueous media is not at all general or without serious restriction. As a matter of fact (for substantially all practical intents and purposes), PVO—E may be characterized as being a water-insoluble polymer. Thus, the high polymer forms of PVO—E are generally insoluble in water at temperatures above about 3–4° C. For example, PVO—E having a Fikentscher K-value of about 20 will not dissolve to any appreciable extent in water that is at room temperature or higher. While PVO—E can be dissolved in ice water, it comes out of solution by means of thermal coagulation (i.e., exhibits a "cloud" point) upon warming of the cold solution to only 3–4° C. At temperatures that are higher than the cloud point of the PVO—E in such cold aqueous solutions, the polymer generally separates by precipitation from the solvent vehicle. Closely analogous phenomena are observed with poly-N-vinyl-4-ethyl-2-oxazolidinone as well as with poly-N-vinyl-4,5-dimethyl-2-oxazolidinone.

PVO—M and its isomer, poly-N-vinyl-4-methyl-2-oxazolidinone, are readily soluble in water, in any concentration. However, PVO—M has a cloud point of about 40° C. in water, at which temperature it will undergo thermal coagulation from most aqueous media, especially those comprised essentially or predominantly of water.

For many applications, the indicated characteristics are not of material consequence. In certain instances, however, they may cause certain disadvantages to be experienced. Thus, in the clarification of beverages to remove haze-inducing ingredients therefrom, it is, as indicated, highly advantageous after the treatment to remove all, or practically all, of the polymeric treating agent from the beverage along with the haze-inducing ingredients coagulated and precipitated therefrom by means of the agent. While this can sometimes be accomplished by use of precise quantities of the treating agent to ensure its complete removal in the precipitate of the haze-inducing ingredients which forms upon addition of the agent, it is difficult in the extreme to consistently and in all instances utilize the exact quantities of the polymeric agent needed for such result. An excellent technique for achieving the desired end is to add the polymeric treating agent at a temperature below its cloud point whereupon coagulation and precipitation of the haze-inducing ingredients in the beverage is caused; then to warm the treated beverage to a temperature above the thermal coagulation or cloud point of the polymeric treating agent in the beverage, whereupon any excess quantity of the polymer that has not been coagulated with the haze-inducing ingredients is caused to precipitate due to cloud point effect. In this way, all or practically all of the polymeric treating agent is removed from the clarified beverage after the treatment.

When homopolymeric PVO—E or PVO—M are employed for beverage clarification, however, it may not always be practical or it may involve operational inconveniences (depending upon the particular polymeric treating agent involved) to take advantage in the indicated manner of the cloud point of the polymeric treating agent in order to ensure its complete removal from the treated beverage. Thus, when PVO—E is utilized, it is necessary to induce extreme chilling in the beverage in order to capitalize upon the cloud point of the polymer during the treatment to permit its complete removal from the clarified beverage. Such temperatures in the handling of the beverage may actually be lower than are desired to be put in effect during processing and may also be lower than any temperature normally achieved in the beverage manufacturing operation. On the other hand, the cloud point of PVO—M may require heating the beverage to a higher temperature than desired with respect to quality control of the beverage itself. In many cases, the heating of a beverage to temperatures in excess of chilled temperatures above about 15–20° C. or so may have a deleterious consequence on the quality of the beverage being treated. This is often the case in carbonated beverages, and is particularly so for the various alcoholic malt beverages, such as beer, etc. Thus, when beer is heated substantially above about 15–20° C. and maintained for any significant period at such elevated temperature, it tends to lose its flavor. In addition, the heating may cause loss of dissolved carbon dioxide or other carbonating gas in beer or the like beverages and also provides opportunity for mold or bacterial growth to be engendered in the beverage being treated.

It would be an advantage, and it is the chief aim and concern of the present invention, to provide copolymers of VO—E and VO—M, hereinafter referred to as P(VO—E/VO—M) having essential functional properties and characteristics for various purposes commensurate with and similar to those of either PVO—E or PVO—M, while at the same time having a more extended and flexible range of water solubility than PVO—E, particularly as regards specific and readily controllable thermal coagulation (or cloud) points in aqueous media so as to permit thermal coagulation of the copolymer from such media at temperatures intermediate between the cloud points of PVO—E and PVO—M, respectively. The inherent benefits of such completely soluble polymeric compositions for various uses, particularly in the clarification of beverages, is manifest from the foregoing description and is further evident in the ensuing specification.

According to the present invention, a water-soluble copolymer of VO—E and VO—M that has cloud points intermediate between those of PVO—E and PVO—M and with functional characteristics and properties commensurate with those of either PVO—E or PVO—M, which copolymers may be employed with great advantage in the clarification of beverages to rid them of haze-inducing ingredients, is of the general structure:

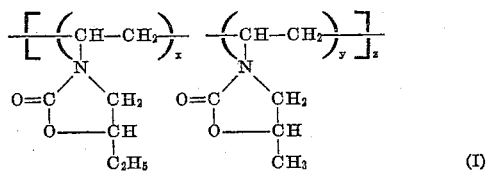

in which on a weight basis $z$ is equal to the sum of $x+y$ and the value of either $x$ or $y$ (and their relative proportion) is such that at least one weight percent of the copolymer consists of either the polymerized VO—E or VO—M monomer. As is apparent, the copolymers may be prepared with any of the isomers of VO—E or any mixtures thereof or with any mixtures of the isomers of VO—E with VO—E. Likewise, N-vinyl-4-methyl-2-oxazolidinone or mixtures thereof with VO—M may be employed in the preparation of the present copolymers.

As little as one percent or so of either of the indicated comonomers in the copolymer product has a marked beneficial effect on the cloud point of the

P(VO—E/VO—M)

product. More highly pronounced effects are noted when the content of either the VO—E or VO—M is between about 5–10 and 90–95 weight percent. Advantageously, for many purposes, about equal weight proportions of the VO—E and VO—M are polymerized together in the copolymer molecule so that, for example, between about 40 and 60 weight percent of polymerized VO—E (or VO—M) is present in the

P(VO—E/VO—M)

product.

The copolymers of the present invention have excellent water solubility with cloud points in aqueous solution that generally are considerably higher than those of PVO—E and intermediate between those of either PVO—E or PVO—M alone. Aqueous solutions containing as much as 40–50 percent by weight of the dissolved copolymer at temperatures beneath its particular cloud point can easily be prepared. In addition, the copolymers usually have substantially complete alcohol solubility, being at least commensurate with the solubility in various lower alkyl alcohols (such as methanol, ethanol, propanol, etc.) of PVO—M.

The densities of the copolymeric products of the present invention, which are usually obtainable in the form of normally solid, amorphous (i.e., non-crystalline), free-flowing, white or light-colored, hygroscopic powders, are generally intermediate between those of the individual homopolymers of the separate comonomeric constituents. To afford illustration of this, the P(VO—E/VO—M) copolymers ordinarily have densities between about 1.188 and 1.285 grams per cubic centimeter (which are the densities of PVO—E and PVO—M, respectively).

The copolymeric products can be prepared in the conventional manner by polymerization in mass (oftentimes referred to as bulk polymerization) as well as polymerization, at practically any level of concentration, in alcoholic or other solution or in emulsion or other dispersion in water and other liquids with which the particular monomers being copolymerized are either not soluble or soluble or only partially soluble. It is ordinarily beneficial for the polymerization to be conducted at a temperature between about 50° and 100° C., although this may vary with the particular catalysts used and the type of reaction being conducted. Suitable catalysts or initiators for the copolymerization include the azo catalysts, such as $a,a'$-azobisisobutyronitrile, peroxygen catalysts, such as potassium persulfate, benzoyl peroxide, lauroyl peroxide, hydrogen peroxide and the like, and irradiation under the influence of high energy fields. The latter catalyzation may include the various actinic radiations, including such diverse forms of catalysis as ultraviolet, X-ray and gamma radiations, as well as radiations from radioactive materials and high energy electron beams generated from linear accelerators, resonant transformers and the like. The copolymers may advantageously be prepared as high polymers having molecular weights, for example, in the range from 5 or 10 to several hundred thousand (as determinable from Fikentscher K-values of about 5–10 or more to as high as 75 to 100 or so). The general correspondence of K-value of the copolymer products to molecular weight, which is a non-linear relationship, is about as follows:

| Fikentscher K-value of VO—E copolymer: | Molecular weight |
| --- | --- |
| 20 | 22,000 |
| 30 | 40,000 |
| 40 | 70,000 |
| 50 | 120,000 |
| 60 | 180,000 |
| 90 | 360,000 |

As mentioned in the foregoing, the copolymer products may be employed, is desired, as dye-assisting adjuvants or dye-receptors for synthetic textile fibers and other shaped articles of normally difficult to dye synthetic polymers in which they may be incorporated, particularly those of the fiber-forming acrylonitrile polymers, including polyacrylonitrile. They may be utilized with particular benefit for beverage clarification in order to precipitate and coagulate the haze-inducing ingredients from a vegetable beverage, such as beer, especially when they are added to the beverage at temperatures beneath their cloud points and, after the desired coagulation and precipitation has been effected, removed from the beverage, at temperatures above the cloud points of the particular copolymers employed.

The invention is further illustrated in and by the following examples, wherein all parts and percentages are to be taken by weight.

*Example A*

Into a one liter resin flask equipped with a reflux condenser, magnetic stirrer, nitrogen inlet, thermometer and infra-red heating temperature control unit, there was charged about 50 grams of essentially pure VO—E (M.W. 128–99.3 percent pure); 50 grams of essentially pure VO—M (M.W. 114–99.6 percent pure); 1 gram of $a,a'$-azobisisobutyronitrile; and 500 grams of dry denatured ethanol. The contents of the flask were stirred constantly and heated under reflux (78° C.) for 10 hours. After this time the reaction was terminated. At least 98 percent conversion of monomers to copolymer product was achieved. The resulting solution was clear, colorless, and syrupy. The P(VO—E/VO—M) copolymeric product, which contained about equal respective weight proportions of the polymerized monomers, was isolated by slowly pouring the reaction mass into about 2 liters of dry diethyl ether whereupon the copolymer precipitated as a white powder having a density of about 1.237 grams per cubic centimeter (after having been dried in vacuum for purification). Its K-value was about 13.

The P(VO—E/VO—M) copolymer product had a molecular weight of about 13,000 and a coagulation (i.e., "cloud") point in water of about 26° C. It was readily soluble in water at any temperature beneath its cloud point and was also completely soluble in such alcohols as ethanol, methanol, propanol, etc.

The foregoing general procedure was duplicated several times, using varied proportions of the monomeric ingredients, to obtain P(VO—E/VO—M) copolymer products containing from 1 to 99 percent of polymerized VO—E. Similar results may also be obtained when the foregoing procedure is essentially duplicated, excepting to replace either the VO—E or VO—M monomers with their isomers or to use mixtures of any of the indicated varieties of isomers.

*Example B*

A series of physical mixtures (or polymer blends) of PVO—E and PVO—M was prepared using homopolymers having K-values between about 20 and 30. When attempted to be dissolved in water at room temperature to obtain solutions having about 5 percent total dissolved solids, the resulting compositions showed the general insolubility and characteristic cloud point of PVO—E above about 3-4° C. Thus, only the PVO—M dissolved from the physical mixture until the composition was chilled to below about 4° C., whereupon the PVO—E also went into the aqueous solution.

In contrast, a series of P(VO—E/VO—M) copolymers were prepared containing varying proportions of VO—E polymerized in the polymer molecule. When the copolymer products were dissolved in ice water (i.e., less than about 4° C.) to make 5 percent solutions and heated, it was observed that the cloud point underwent a significant rise with increasing amounts of VO—M in the copolymer. Thus, in a copolymer containing 20 percent VO—M, the cloud point was about 11° C.; with about 40 percent VO—M, it was about 19° C.

The aqueous solutions of the copolymer were found to become frothy upon mechanical agitation, indicating the properties of the copolymers as surface active agents. The results of these data are graphically illustrated by the curve in the accompanying drawing, wherein the K-values of some of the various copolymers made and tested are also indicated.

*Example C*

To 100 ml. of a commercially obtained bottle beer (Carlings "Black Label") having an alcohol content of about 3.5 percent, there was added 1 ml. of a 2 percent aqueous solution of P(VO—E/VO—M) having a Fikentscher K-value of about 11 and containing about 40 percent of polymerized VO—M in the copolymer molecule. Prior to treatment, the beer was cooled to about 15° C. and maintained at this temperature during the experiment. The aqueous solution of the copolymer added to the beer was at a temperature of about 15° C. Upon addition of the P(VO—E/VO—M) to the beer, a cloudiness became immediately apparent in the treated beverage. This was the result of a complex formed by the polymer and the haze-inducing ingredients in the beverage. Thus, even without benefit of thermal coagulation of the P(VO—E/VO—M), the haze-inducing ingredients of the beverage were affected by the copolymer.

*Example D*

The procedure of the foregoing example was repeated excepting to employ two samples of the beer and to add only 0.1 ml. of the cold P(VO—E/VO—M) solution to each beer sample. Thus, the concentration of the polymer in each of the samples was about 0.002 percent. One of the samples was maintained at 15° C. for an hour. The other was warmed to about 20° C. The warmed sample was appreciably more cloudy than the sample that was permitted to remain at 15° C. After an hour, the warmer sample was observed to have a fine and distinct precipitation deposited on the bottom of the vessel in which it was contained. The unwarmed sample, which was retained at 15° C., remained cloudy all over without any noticeable collection of precipitate at its bottom. Each of the samples was then filtered through filter paper while being maintained at the temperature of the treatment. The warmer sample ran through the paper rapidly to yield a perfectly clear beer. Filtration of the sample that had been maintained chilled at 15° C. was much slower and the filtered product was noticeably less clear than that from the warmer sample. From the foregoing, the advantage of thermally coagulating the added P(VO—E/VO—M) in order to obtain a course precipitate which can be readily removed from the beer or other beverage being treated is readily apparent.

Similar results may be obtained with other copolymers of VO—E and VO—M having different cloud points using temperature conditions during the treatment in accordance with and to take advantage of the particular cloud point of the copolymer employed.

*Example E*

A spinning solution comprised of about 10 parts of polyacrylonitrile dissolved in about 90 parts of a 60 percent aqueous solution of zinc chloride is extruded through a spinnerette having 750 orifices, each having a diameter of about 0.006 inch, into an aqueous coagulating bath that contains about 42 percent of zinc chloride dissolved therein to be spun into a multiple filament tow. The coagulated tow is washed substantially free from salt after being withdrawn from the coagulating bath and collected. There is thereby obtained an aquagel fiber containing about 2 parts of water for each part of polymer therein.

About 1.5 parts of the aquagel (on a wet weight basis) is immersed for about 20 minutes in an aqueous solution of about 3 percent of a P(VO—E/VO—M) copolymer containing about equal respective weight ratios of each of the monomers in the copolymer molecule. The applicating solution is maintained slightly warm at about 30° C. during the impregnation without experiencing any occurence of polymer clouding. The copolymer employed has a Fikentscher K-value of about 13 and is prepared as set forth in the first example. After being impregnated, the polyacrylonitrile fiber is removed from the impregnating bath and dried for 15 minutes at about 150° C. Its dye-receptivity when dyed in the conventional manner with 4 percent Calcodur Pink 2BL (C. I. 353) is found to be excellent, with the copolymer-containing fiber accepting the dyestuff to deep and level shades of coloration. Commensurate results are obtained when the adjuvant consists of any other of the P(VO—E/VO—M) copolymers of the invention.

What is claimed is:
1. A normally solid copolymer consisting essentially of between about 1 and 99 weight percent, based on the weight of the copolymer, of copolymerized N-vinyl-5-ethyl-2-oxazolidinone with between about 99 and 1 weight percent, based on the weight of the copolymer, of copolymerized N-vinyl-5-methyl-2-oxazolidinone.

2. The copolymer of claim 1, containing from about 5 to 95 weight percent of said N-vinyl-5-ethyl-2-oxazolidinone.

3. The copolymer of claim 1, containing about equal weight proportions of each of said monomers.

References Cited in the file of this patent

UNITED STATES PATENTS 2,818,399    Drechsel _____ Dec. 31, 1957